United States Patent [19]

Tanaka et al.

[11] Patent Number: 5,778,926

[45] Date of Patent: Jul. 14, 1998

[54] PRESSURE REGULATING VALVE AND FUEL SUPPLY SYSTEM USING THE SAME

[75] Inventors: Masaaki Tanaka, Tsu; Keiichi Yamashita, Kariya; Kouji Izutani, Nagoya; Kingo Okada; Hideto Takahashi, both of Kariya, all of Japan

[73] Assignee: Nippondenso Co., Ltd., Kariya, Japan

[21] Appl. No.: 721,338

[22] Filed: Sep. 26, 1996

[30] Foreign Application Priority Data

Feb. 3, 1995 [JP] Japan .................... 7-017308

[51] Int. Cl.$^6$ .................................... F16K 31/12
[52] U.S. Cl. .................. 137/508; 123/514; 123/509; 251/127; 251/86; 251/118
[58] Field of Search ................. 137/508; 123/514, 123/509; 251/127, 86, 118

[56] References Cited

U.S. PATENT DOCUMENTS

| 2,839,078 | 6/1958 | Lornitzo | 137/508 |
| 4,116,212 | 9/1978 | Cooper | 137/508 |
| 4,137,933 | 2/1979 | Culpepper | 137/508 |
| 4,335,744 | 6/1982 | Bey | 251/127 |
| 5,361,742 | 11/1994 | Briggs et al. | 123/514 |
| 5,392,750 | 2/1995 | Laue | 123/509 |
| 5,435,344 | 7/1995 | Robinson et al. | |
| 5,649,514 | 7/1997 | Okada et al. | 123/509 |

FOREIGN PATENT DOCUMENTS

| 55-59870 | 4/1980 | Japan . | |
| 2-122165 | 10/1990 | Japan . | |
| 121662 | 9/1927 | Switzerland | 137/508 |
| 612344 | 11/1948 | United Kingdom | 137/508 |

Primary Examiner—Denise L. Ferensic
Assistant Examiner—Ramyar Farid
Attorney, Agent, or Firm—Nixon & Vanderhye P.C.

[57] ABSTRACT

A compact pressure regulating valve makes installation work simple and has a hermetic structure of a stationary value member without a specific seal member. A pressure regulator (201) has a body (203) which includes a fuel inlet (215) and an inner periphery for positioning a stationary valve member (205) in a radial direction. When the movable valve member (208) leaves the stationary valve member (205), the valve opens. Operation of the movable valve member (208) is controlled by a diaphragm which moves to balance the pressure of the pressure chamber (211) and the pressure of a back pressure chamber (213) combined with a biasing pressure of a compression coil spring (214). As a result, the pressure of the pressure chamber (211) can be controlled without a specific sealing member or complex structure. In addition, a pressure regulating valve according to the present invention is compact and easy to install, and has no specific member to seal the stationary valve member.

7 Claims, 9 Drawing Sheets

1

PRESSURE REGULATING VALVE AND FUEL SUPPLY SYSTEM USING THE SAME

This is a Continuation of PCT application PCT/JP96/00203, filed 01 Feb. 1996.

TECHNICAL FIELD

The present invention relates to a fuel supply system for an internal combustion engine (hereinafter referred to as engine).

BACKGROUND ART

In a fuel injection system for an engine as disclosed in JPA 59-170466, the fuel pressure is driven by a fuel pump that pumps fuel from a fuel tank. The fuel pressure is regulated by a pressure regulating valve (hereinafter referred to as pressure regulator). The regulated fuel is supplied to fuel injecting valves and fuel drained by the pressure regulator is returned to the fuel tank. The fuel injection system shown in JPA '466 has a typical pressure regulator. As shown in FIGS. 2, 3 and 4 of the above JPA publication, the fuel inlet and fuel outlet are disposed in a direction perpendicular to the direction of the motion, that is in the axial direction, of a diaphragm which is disposed in the case of the pressure regulator. U.S. Pat. No. 5,435,344 discloses in FIGS. 2, 3 and 5 thereof a pressure regulator, which has the fuel inlet disposed at a position shifted from the center axis of the diaphragm, resulting in increased diameter of the regulator.

The pressure regulators disclosed in the JPA 59-170466 and U.S. Pat. No. 5,435,344 publications have a fuel inlet disposed outside the fuel supply pipe where the fuel pressure is to be regulated. In these publications the pressure regulator is shown as being disposed outside of a pipe connected to the fuel inlet. There is no showing in these publications that the pressure regulator be disposed in an internal portion of the fuel pipe connected to the fuel inlet.

The conventional pressure regulator, which has the fuel inlet outside of the fuel pipe connected to the fuel inlet, has a comparatively large case and requires a specific structure for the fuel inlet in the case, to connect an inlet pipe to the case and to seal the case. The publication JPA 59-170466 discloses a stationary valve member of the pressure regulator which is fixed to a hole formed in the high-pressure-side-wall of the regulator body. Therefore, a special and high-cost soldering manufacturing step is necessary to provide a hermetic seal between the stationary valve member and the body.

Therefore, a main object of the present invention is to provide a simple and compact pressure regulating valve which has a fuel passage formed in the stationary valve member.

Another object of the present invention is to provide a compact fuel supply system which has a unit of highly integrated components of the fuel supply system including the pressure regulator. A further object of the present invention is to provide a compact fuel supply system in which the fuel pressure regulator and a fuel filter can be installed in the fuel tank with ease.

A pressure regulating valve according to an embodiment of the present invention comprises: a case having a fuel inlet at one end and a fuel outlet at the other end; a stationary valve having a stationary valve member and a stationary valve guide for guiding the stationary valve member, the stationary valve fixed to an inner periphery of the case; a movable valve member having a valve aperture, the aperture closing when the movable valve member is seated on the stationary valve member; a diaphragm, fixed to the movable valve member at a central portion thereof and to the case at a peripheral portion thereof, for dividing inside of the case into a pressure chamber on a side of the stationary valve member and a back-pressure chamber on the other side opposite the stationary valve member; and biasing means for biasing the movable valve member in a direction to close the valve aperture; wherein the stationary valve guide divides the pressure chamber into an inlet-side pressure chamber on a side of the fuel inlet and a diaphragm-side pressure chamber on a side of the diaphragm, and has a convex portion extending toward the case; and the convex portion has a communication space for connecting the inlet-side pressure chamber and the diaphragm-side pressure chamber.

According to an embodiment of the pressure regulating valve, the stationary valve member is fixed to the inner periphery of the case having the fuel inlet and fuel outlet, and the convex portion has a communication space for connecting the inlet-side pressure chamber and the diaphragm-side pressure chamber. Therefore, the pressure regulating valve can regulate the pressure in the pressure chamber to a set value with a simple structure and a compact size.

In the a pressure regulating valve, the communication space may be defined by a wall of the stationary valve guide formed in parallel with a surface on which the stationary valve member slides.

Moreover, the fuel inlet may be disposed in alignment with an axis of the valve aperture of the movable valve member seated on the stationary valve member.

In addition the case of the pressure regulating valve may comprise a press-formed plate.

The invention may also reduce the noise caused by boiling-under-reduced-pressure due a pressure difference between the inlet-side of the movable valve member to the outlet-side of the same, or reduce the noise caused when fuel collides with a wall of the case of the pressure regulating valve.

The fuel supply system of the present invention may have a fuel pump disposed in a fuel and tank for sucking fuel, a fuel filter for removing foreign particles in the fuel before supplying the fuel to an injector. The fuel filter is disposed in a space around the fuel pump and the fuel regulating valve is disposed in the reminder of the space around the fuel pump. Therefore, the other parts of the fuel supply system can be integrated in a space. In addition, the pressure regulator and the fuel filter can be installed in the fuel tank with ease.

PREFERRED EMBODIMENTS OF THE INVENTION

Figure 1:
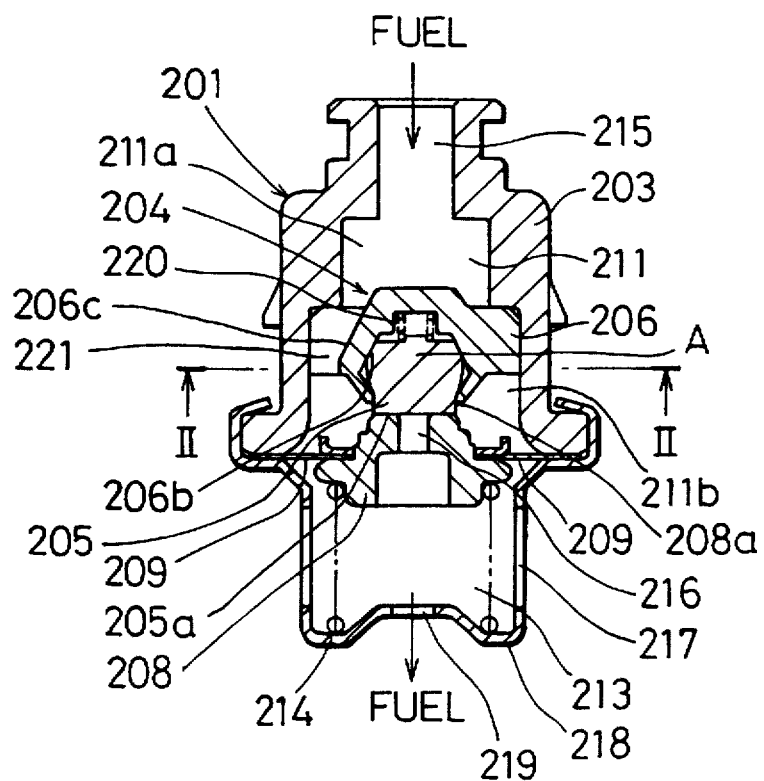
FIG. 1 is a cross-sectional view illustrating a pressure regulator according to a first embodiment of the present invention.

Preferred embodiments of the present invention are described with reference to the appended drawings.
(First Embodiment)

A pressure regulator 201 according to a first embodiment of the present invention has a body 203, a housing 218 fixed to a flange portion of the body 203 by caulking. The housing 218 accommodates a stationary valve member 205, a guide 206 of the stationary valve 205, a movable valve member 208, a diaphragm 209 and a compression coil spring 214. The body 203 is made of resin or aluminum and has a fuel inlet 215 and a pressure chamber 211 connected to the fuel inlet 215. The stationary valve guide 206 is press-fitted to the inner periphery of the body 203. The body 203 and the housing 218, which is described later, form a case. The pressure chamber 211 is divided by a stationary valve, which is described later, into an inlet-side pressure chamber and a diaphragm-side pressure chamber.

The stationary valve is composed of the stationary valve member 205 and the stationary valve guide 206. The stationary valve member 205 is biased by a second compression coil spring 220 against the center of the stationary valve guide 206 toward a position A in FIG. 1. The stationary valve guide 206 has a generally thick disk portion and a central convex portion facing the case. A plurality of arc-shaped concaves 222 are formed around the convex portion at even intervals as connecting spaces for fuel passages 221. The outer peripheries 223 between the adjacent convex portions 222 are press-fitted to the inner periphery 203a of the body 203. A tapering surface 206b is formed inside the stationary valve guide 206 to align the axis of the stationary valve member 205, and outer walls 206c are formed thereon in parallel with the tapering surface 206b.

The movable valve member 208 is fixed to the center of the diaphragm 209. The outer periphery of the diaphragm 209 is fixed to an open end of the body 203 with a portion of the housing 218 by caulking. The axial position of the movable valve member 208 is decided by a pressure difference between a pressure chamber 211 on one side of the diaphragm 209 and a back pressure chamber 213 on the other side thereof and a set pressure of the compression spring 214. FIG. 1 illustrates the valve closing state with the stationary valve member 205 being in contact with the movable valve member 208. When the movable valve member 208 moves from the stationary valve member 205 downward in FIG. 1, the valve opens and connects a valve aperture 216 and the pressure chamber 211. The valve aperture 216 shown in FIG. 1 is in the closed state.

The compression coil spring 214, as a means for biasing, engages the movable valve member 208 at one end thereof and the inner surface of the housing 218 at the other end so that the movable valve member 208 is biased toward the stationary valve member 205.

The housing 218 has a fuel outlet 219 formed at the center thereof coaxially with the valve members. The fuel inlet 215, the valve aperture 216 and the fuel outlet 219 are formed to align with the same valve axis. A through hole 217 is formed in the side wall of the housing 218.

The second compression coil spring 220 biases the stationary valve member 205 outward from the stationary valve guide 206 so that a seat portion 205a of the stationary valve member 205 can elastically engage with or disengage from a seat portion 208a of the movable valve member 208, and prevent the movable valve member 205 from rattling, thereby sealing the valve when closed.

The operation of the pressure regulator 201 is described next.

When a fuel is taken through the fuel inlet 215 into the pressure chamber 211 of body 203, the diaphragm 209 moves so as to equalize the pressure difference between the pressure chamber 211 and the back pressure chamber 213 with the preset pressure of the compression coil spring 214. Thus, the engagement or disengagement of the movable valve member 208 with or from the seat portion 205a of the stationary valve 205 is controlled. The stationary valve closes when the movable valve member 208 engages with the stationary valve member 205 and opens when the former leaves the latter. When the stationary valve opens, the fuel in the pressure chamber 211 is discharged from the fuel outlet 219 through the fuel passages 221, the valve aperture 216, and the back pressure chamber 213. Because the outer walls 206c are formed in parallel with the tapering surface 206b, the thickness of the stationary valve guide 206 can be made even, resulting in a compact pressure regulator.

In this embodiment, the stationary valve guide 206 is press-fitted to the inner periphery of the body 203. However, it can be fixed by caulking or soldering.

In this embodiment, the stationary valve 204 has the valve function without specific sealing member. Since the fuel inlet 215 and the fuel outlet 219 are formed to align with the valve axis, the pressure regulator can be made compact. In addition, the hermetic sealing can be provided without specific sealing members.
(Second Embodiment)

A second embodiment is described with reference to FIGS. 3 and 4.

Figure 2:
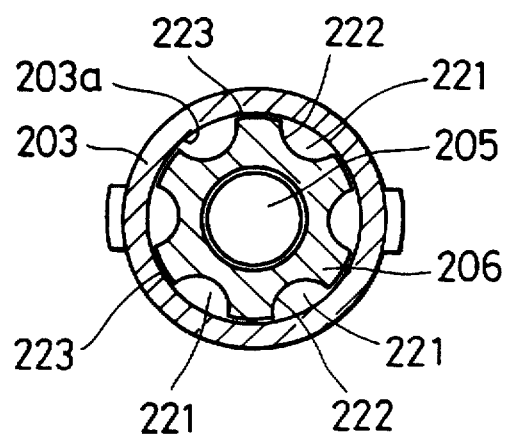
FIG. 2 is a cross-sectional view illustrating a portion cut along a line II—II in FIG. 1.
Figure 3:
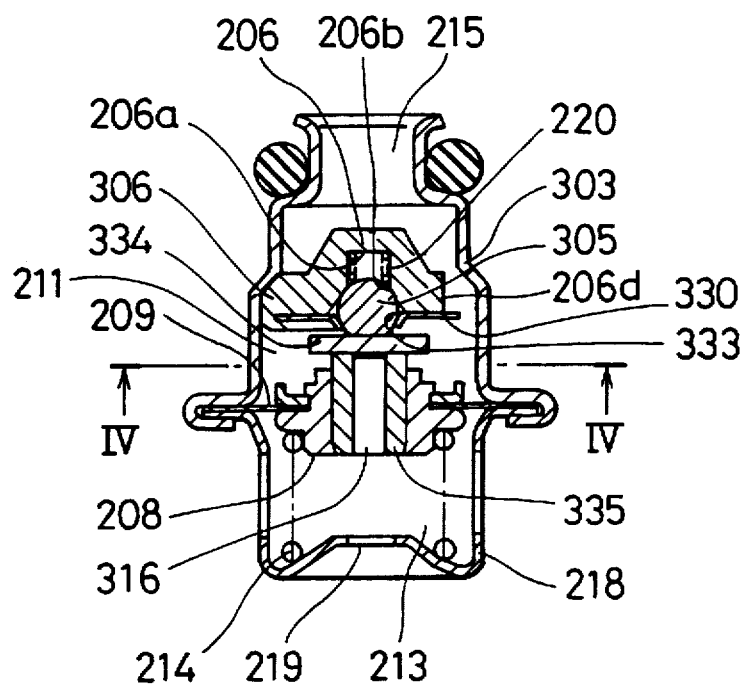
FIG. 3 is a cross-sectional view illustrating a pressure regulator according to a second embodiment of the present invention.
Figure 4:
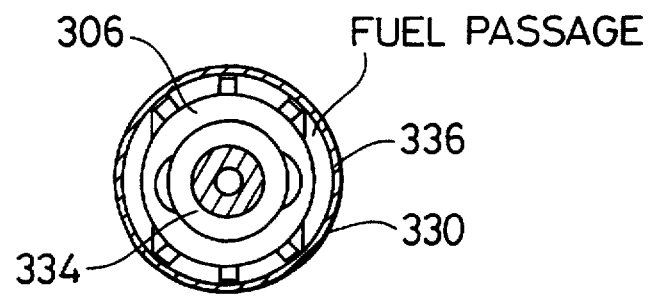
FIG. 4 is a cross-sectional view illustrating a portion cut along a line IV—IV in FIG. 3.

The body 303 of the second embodiment shown in FIG. 3 has the press-formed shell thinner than that of the first embodiment shown in FIG. 1. The same reference numerals in FIG. 3 indicate substantially the same parts or portions as the first embodiment shown in FIGS. 1 and 2.

The body 303 and the housing 218 are caulked together with the diaphragm 209 disposed between them. The stationary valve guide 206 is press-fitted to the inner periphery of the body 303. The second compression coil spring 220 is disposed in a concave 206a of the stationary valve guide 206 to bias a ball 305, which is the stationary valve body, downward as shown in FIG. 3. An annular thin plate 330 has a hole 333, whose diameter is designed to hold the ball 305, but to allow a part thereof to protrude downward. A valve seat plate 334 is fixed to the protruding part of the ball 305 by welding so that a cylindrical seat portion 335 of the movable valve member 208 can engage therewith. The cylindrical seat portion 335 is made of a wear resistant material and fixed to the center of the movable valve member 208. The stationary valve guide 206 has a generally cylindrical thick wall 206d and a flange portion 306 which has circumferentially extending spaces 336 for providing axial communication as shown in FIG. 4. The wall 206d, which defines the space 336 and has a contact surface tightly receiving the ball 305 inside, is formed in parallel with the axis of the pressure regulator.

Therefore, the diameter of the pressure regulator can be made small.

In the second embodiment, since the body 303 is formed to be thin, the pressure regulator can be made more compact than the first embodiment. Since the cylindrical seat portion 335, which is fixed to the diaphragm 209 to be in contact with the valve seat plate 334, is made of a wear resistant material, the life time of the valve is increased.

Other portions indicated by the same reference number are substantially the same as those of the first embodiment. In the second embodiment shown in FIG. 3 and 4, a valve aperture 316 is formed at the center of the cylindrical seat portion 335 to pass the fuel therethrough. When the pressure of the pressure chamber 211 increases, the diaphragm 209 moves down in FIG. 3 in order to balance it with the pressure of the back pressure chamber and the set pressure of the compression spring coil 214, and the seat portion 335 leaves the valve seat plate 334. Consequently, the fuel in the pressure chamber 211 is discharged from the fuel outlet 219 through the valve aperture 316 and the back pressure chamber 213.

In the second embodiment, since the outer periphery of the stationary valve guide 206 is press-fitted to the inner periphery of the body 303, the valve can be sealed hermetically without specific sealing members, resulting in a simple valve structure. In the pressure regulator, the fuel passage which is composed of the fuel inlet 215, the valve aperture 316 and the fuel outlet is aligned with the common valve axis. Therefore, the diameter of the pressure regulator can be reduced.

(Third Embodiment)

A fuel supply system according to a third embodiment of the present invention is described with reference to FIGS. 5 and 6.

Figure 5:
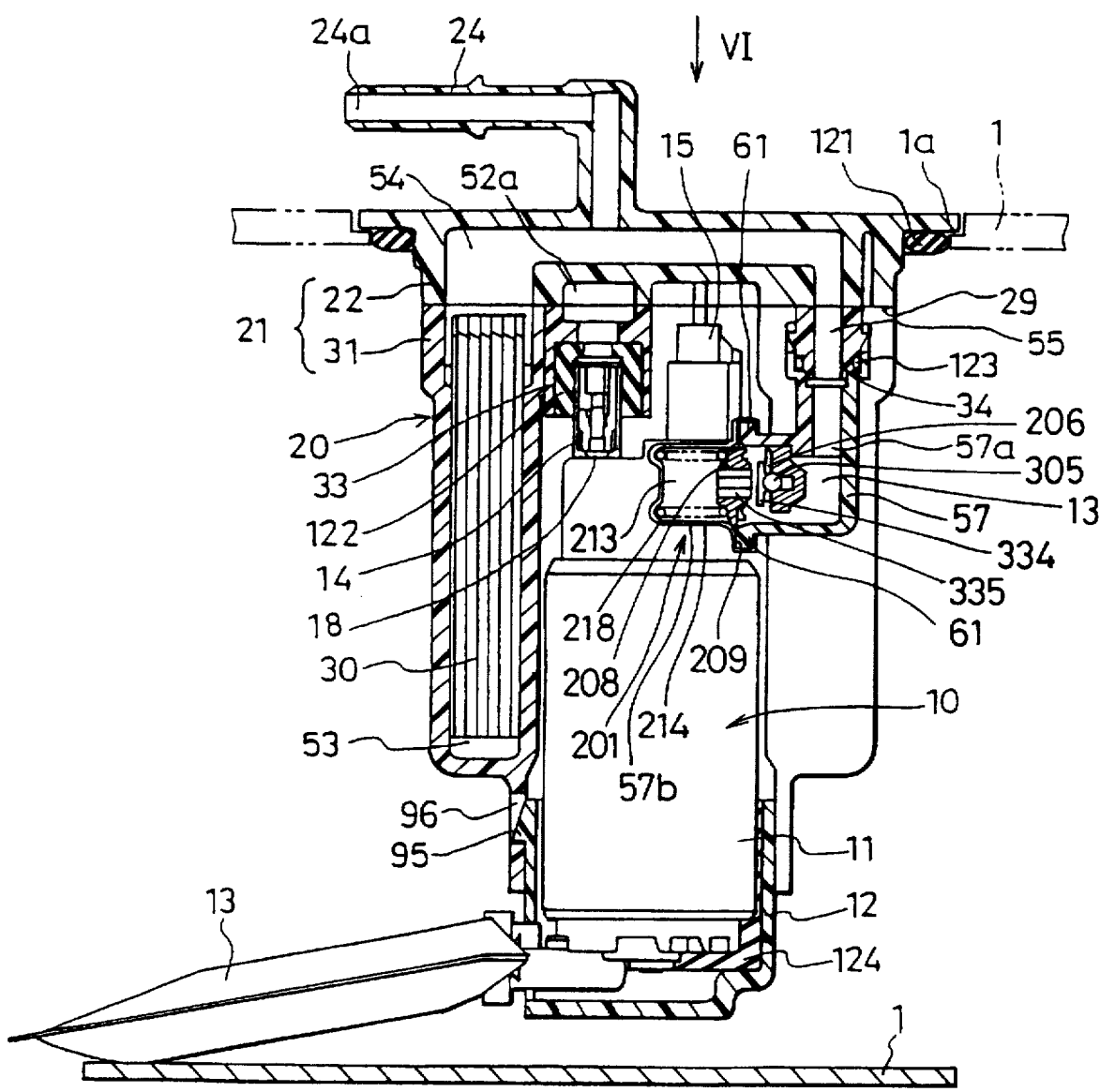
FIG. 5 is a longitudinal cross-section of a third embodiment of the present invention.
Figure 6:
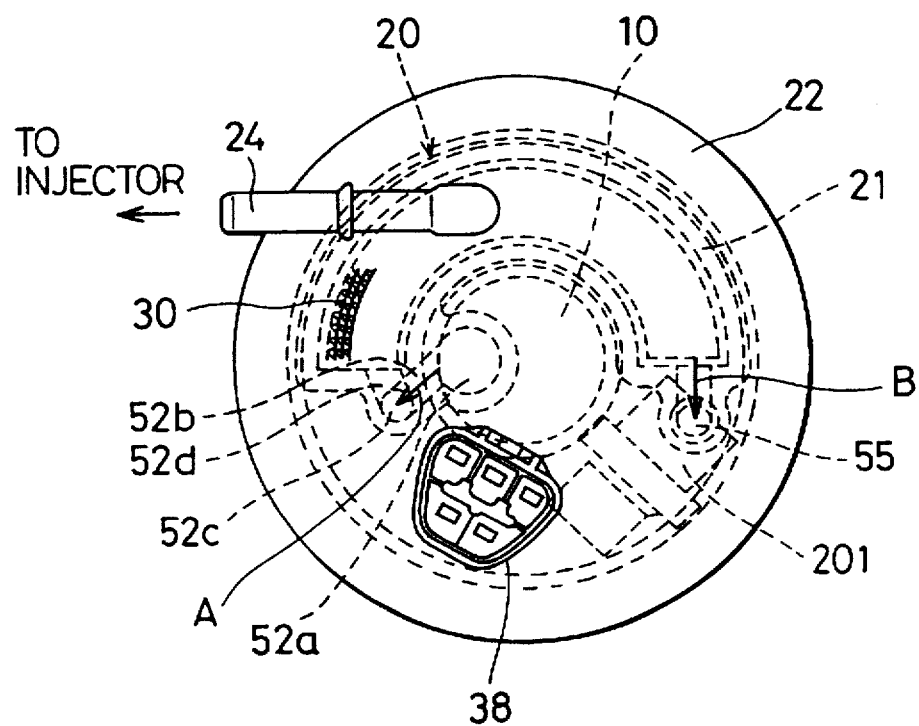
FIG. 6 is a view illustrating a portion viewed from a direction indicated by an arrow VI in FIG. 5.

As shown in FIGS. 5 and 6, a fuel pump 10, a filter 20, the pressure regulator 201 and other parts are installed through an upper opening into a fuel tank 1. The pressure regulator 201 is almost the same as that of the second embodiment.

The body 61 of the pressure regulator is made of a resinous material and the stationary valve guide 206 has a receiving portion having T-shaped cross-section. The body 61 has the fuel inlet which has funnel-shaped opening and a connecting groove for receiving a return pipe (described later) in a snap-fit-fashion. Other parts or portions are substantially the same as the second embodiment.

As shown in FIG. 6, the fuel pump 10 is disposed at the center of the filter case 21, and the semi-cylindrical fuel filter 20 is disposed at the circumference of the fuel pump 10. The pressure regulator 201 is disposed at the circumference of the fuel pump 10 opposite the semi-cylindrical fuel filter 20. Thus, various parts can be disposed at the space around and above the fuel pump 10 effectively and accommodated in the fuel tank within the depth of the fuel tank.

As shown in FIG. 5, the fuel pump 10 is disposed in a pump case 12 which is fitted to the lower potion of the filter case 21, and the semi-cylindrical filter 20 is disposed at the upper portion of the fuel pump. Therefore, the fuel filter 20 is disposed in the axial direction of the fuel pump to partly surround and overlap with the fuel pump 10 at the lower portion thereof. Accordingly, the axial length of the pump 10 or the height thereof corresponding to the depth of the tank can be reduced, thereby forming a compact fuel supply system having highly integrated parts therein.

The pump case 12 accommodates the pump unit 11 of the fuel pump 10 and is fixed to the filter case 21 by claws 95, which engage with holes 96 formed in the filter case 21 in a snap-fit fashion. Therefore, the pump unit 11 can be easily detached from the filter case 21. The pump unit 11 is supported by an upper rubber member 122 and a lower rubber member to float between the pump case 12 and the filter case 21. The fuel sucked by the pump unit 11 from the fuel tank 1 is sent to the filter 13 to remove foreign particles. The pressure of the fuel sent to the fuel filter 20 by the pump unit 11 is regulated by the pressure regulator 201 to a set value. The fuel is filtered by the fuel filter 20 to remove foreign particles and sent to fuel injectors (not shown) from a fuel outlet pipe 24.

The fuel filter 20, the fuel pump 10 and the pressure regulator 201 are assembled so that they can be detached easily. The filter case 21 of the fuel filter 20 is made of a resinous material mixed with carbon fiber or carbon powder to conduct electricity. The filter case 21 is grounded to a vehicle body. The filter case 21 is composed of an upper case 22 and a lower case 31. The upper case 22 and the lower case 31 are welded together at the interface 29 thereof. The upper case 22 of the fuel filter 20 has a flange portion, which is fitted via a gasket 121 to a groove formed along the inner periphery of an opening located at an upper wall of the fuel tank, thereby fixing the filter 20 to the fuel tank 1. The fuel filter 20 has a fuel inlet pipe and two fuel outlet pipes formed in the fuel case 21. A suction pipe 33, which is the fuel inlet pipe, is connected to a discharge pipe 14 of the pump unit 11. A first one 24 of the two fuel outlet tubes supplies injectors with the fuel whose foreign particles are removed by the filter element 30. A return pile 34, which is the other of the fuel outlet tubes, is connected to the pressure regulator 201 to regulate the fuel pressure to a set value.

As shown in FIG. 6, an electric connector 38 is disposed on the upper case 22 so as to avoid interference with the semi-cylindrical fuel filter 20. The electric connector 38 has a terminal connected to an electric connector of the fuel pump 10 by a lead wire (not shown), which supplies the motor (not shown) of the pump unit 11 with electric power.

As shown in FIG. 5, the outer periphery of the discharge pipe 14 located at the upper portion of the pump unit 11 and the inner periphery of the fuel inlet pipe 33 of the fuel filter 20 are sealed by the rubber member 122. Therefore, connection of the fuel discharge pipe 14 and the fuel inlet pipe 33 does not require excessively tight sealing, so that the fuel discharge pipe 14 and the fuel inlet pipe 33 can be made without difficulty. Therefore, the fuel pump 10 and the fuel filter 20 can be detached with ease. A check valve 18 is disposed in the fuel discharge pipe 14 to check the fuel flowing backward to the pump unit 11 and, also, to hold the pressure of the fuel staying in the fuel passage.

The pressure regulator 201 is fixed to the body 61, which is a part of a pipe 57 fitted to a return pipe 34 via an O-ring 123. Therefore, the pressure regulator 201 can be detached easily from the filter case only by detaching the pipe 57 from the return pipe 34. The housing 218 is fixed to the body 61 at an end thereof together with the peripheral portion of the diaphragm 209 by caulking. Substantially the same portions as those in FIGS. 1, 2, 3 and 4 are indicated in FIG. 5 by the same reference numeral.

Flow of the fuel is described next.

The fuel is sucked by the fuel pump 10 through the filter 13 and the fuel pump inlet into the inside of the fuel pump 10, and is discharged from the discharge pipe 14. Then, the fuel goes through passages 52a and 52b formed in the upper case 22 as indicated by an arrow A in FIG. 6, and goes down through a passage 52c and through a passage 52d into a filter inlet chamber 53. After passing through the filter element 30, the fuel passes through a passage 54, where a part of the fuel is supplied to injectors through the fuel outlet pipe 24 and the remainder goes to a passage 55 of the return pipe 34 as indicated by an arrow B, passes through an inlet passage 57a of the pipe 57, the pressure regulator 201, an outlet passage 57b and returns to the fuel tank 1. The pressure in the passage 54 is regulated by the pressure regulator 201. When the pressure is higher than a set value, a part of the fuel is returned from the pressure regulator 201 to the fuel tank 1 through the passage in the pipe 57.

Operation of the fuel supply system is described next. When the pressure of the fuel introduced to the passage 57a through the filter element 30 and the passages 54 and 55 exceeds a set pressure of the compression coil spring 214, the diaphragm 209 moves toward the back pressure chamber 213 against the biasing force of the compression coil spring 214. At the same time, the movable valve member 208 moves along with the diaphragm 209 and leaves the valve seat plate 334. Consequently, the fuel in the pressure chamber 211 of the pipe 57 returns to the fuel tank 1 through the back pressure chamber 213. Because the diaphragm 209 moves to balance the biasing force of the compression coil spring 214 with the fuel pressure of the pressure chamber 214 and controls the fuel return through the back pressure chamber 213, the supply pressure of the fuel driven by the pump unit and supplied from the fuel filter 20 to the injectors can be regulated to a set value.

According to this embodiment, (1) a semi-cylindrical filter 20 is disposed in a space of a circumference of the fuel pump 10, the pressure regulator is disposed in another space of the same circumference, and various parts (not shown) including a fuel-level gauge are disposed in the remainder of the spaces; (2) The lower portion of the semi-cylindrical fuel filter 20 is disposed in the space around the fuel pump 10 so as to longitudinally overlap with the upper portion of the fuel pump 10, and the electric connector 38 is disposed in the remainder of the space above the fuel pump 10 so that the axial length of the fuel supply system's pump or the ratio of the same to the fuel tank's depth can be reduced. As stated above, various parts of the fuel pump 10, fuel filter 20 and the pressure regulator 201 are integrally accommodated in the cylindrical space extending in the axial and radial direction of the fuel pump 10. Therefore, a compact fuel supply system can be provided.

In this embodiment, the fuel filter 20 and the pressure regulator 201 are detachable from each other and the fuel filter 20 can be detached from the fuel tank 1 easily. Therefore, each one of the fuel filter 20 and the pressure regulator 201 can be replaced separately. Because the pressure regulator 201 is disposed in the fuel tank 1 and only one-way fuel pipe from the tank 1 to the engine is provided, the fuel heated by the engine can not return to the fuel tank 1. Therefore, temperature of the fuel tank 1 can be kept within a level to prevent generation of the fuel vapor or bubbles in the fuel.

In this embodiment, the fuel pump 10 is hung by the filter case 21. Therefore, it is easy to install the fuel pump 10 into the fuel supply system, which simplifies structure of the parts disposed in the tank 1.

(Fourth Embodiment)

Figure 7:
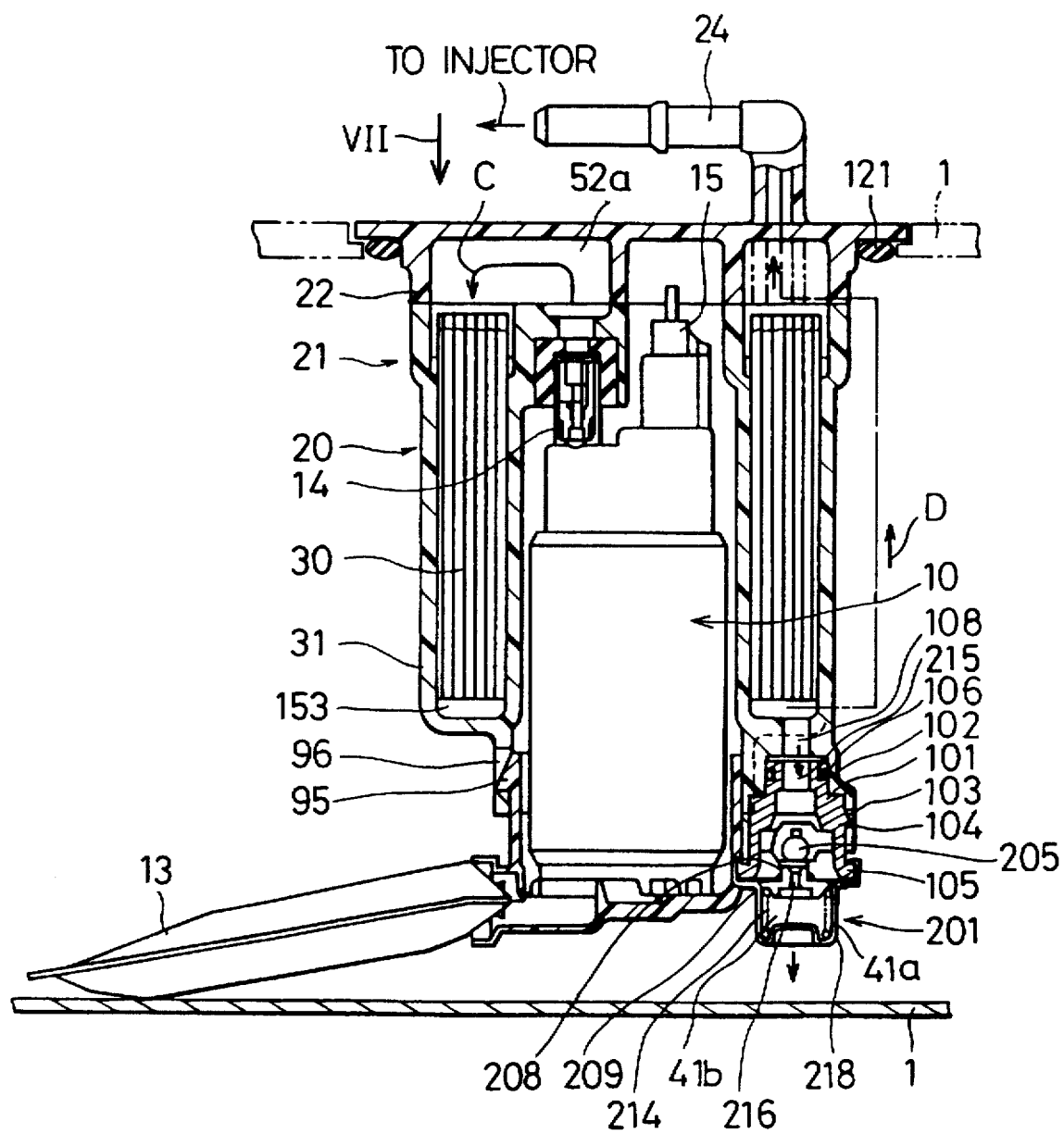
FIG. 7 is a longitudinal cross-section of a fourth embodiment of the present invention.

A fourth embodiment of the present invention is described with reference to FIGS. 7 and 8.

In a fuel supply system according to the fourth embodiment, the pressure regulator 201 is fixed to a lower portion of the fuel filter 20 which is accommodated in the fuel tank 1.

Figure 8:
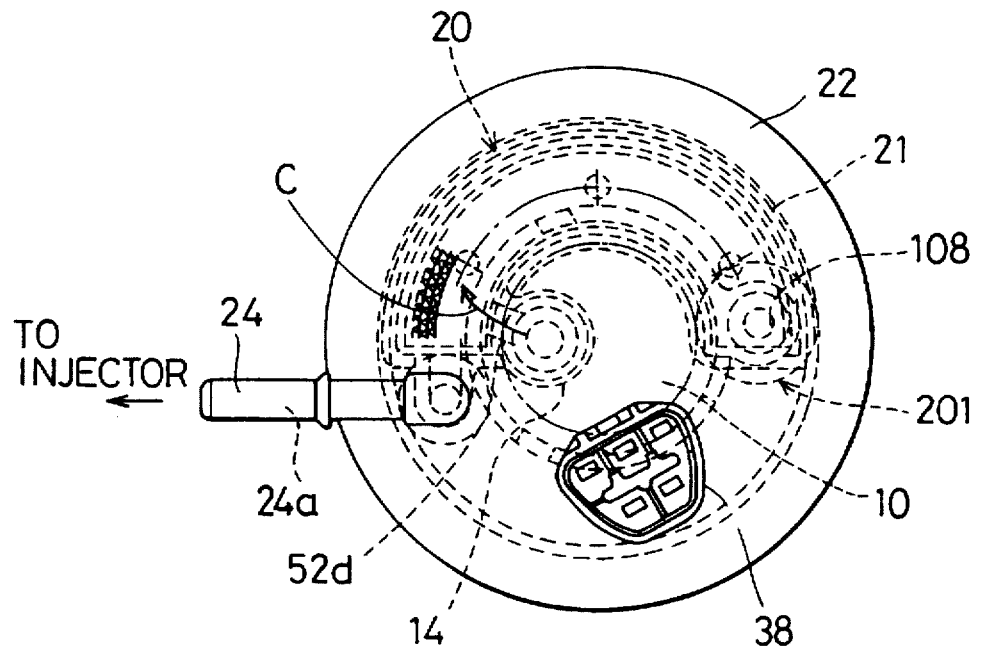
FIG. 8 is a view illustrating a portion viewed from a direction indicated by VIII in FIG. 7.

As shown in FIG. 8, the fuel pump 10 is disposed at the center of the filter case 21 and the semi-cylindrical fuel filter is disposed at the circumference of the fuel pump 10. The pressure regulator 201 is disposed in an annular space formed around the fuel pump 10 under the semi-cylindrical fuel filter 201.

The pressure regulator 201 has a pressure regulator body 101, and the lower case 31 has a cylindrical member 102 which extends downward to receive the pressure regulator body 101 therein via an O-ring 106. The cylindrical member 102 has a slot and the pressure regulator body 101 has a claw so that they engage detachably with each other in a snap-fit fashion. Therefore, the pressure regulator 201 can be detached from the filter case 21 easily when the pressure regulator body 101 is disengaged from the cylindrical member 102. The upper end of the housing 218 is fixed to a body fixing flange 105 by caulking with the peripheral portion of the diaphragm 209 disposed between them. The housing 218 has a fuel outlet 41a, which equalizes the pressure of a spring chamber 41b with the pressure in the tank 1. The movable valve member 208 is connected to the diaphragm 209 and is biased by the compression coil spring 214 toward the stationary valve member 205.

The fuel flow is described next.

When the pump 10 sucks the fuel, the fuel passes through the fuel filter 13, the fuel pump inlet and inside of the pump, and goes out of the fuel discharge pipe 14. Then, it passes through the passage 52a of the upper case 22 as indicated by an arrow C in FIGS. 7 and 8, goes down in the filter element 30 to a filter outlet chamber 153 through a passage 52d. A part of the fuel is sent in a direction indicated by an arrow D through a passage (not shown) to injectors through the fuel outlet pipe 24. The remainder of the fuel is discharged to the tank 1 through a passage 108 inside the cylindrical member 102 and the fuel inlet 215 of the body 101. The pressure of the fuel in the filter inlet chamber 153 is regulated by the pressure regulator 201. The fuel is discharged from the pressure regulator 201 when the pressure is higher than a set value as described before.

Thus, the space surrounding the generally cylindrical fuel pump and the space under the fuel filter accommodate various parts effectively and tightly.

According to the fourth embodiment, water coming into the filter inlet chamber 153 is drained from the valve aperture 216 through the pressure regulator 201. Therefore, water is prevented from accumulating in the filter case 21.

According to the fourth embodiment, the disposition of the pressure regulator 201 in the space around the fuel pump 10 under the semi-cylindrical fuel filter 20 makes the external form of the assembly of the fuel pump 10, fuel filter 20 and the pressure regulator 201 even and compact.

(Fifth Embodiment)

Figure 9:
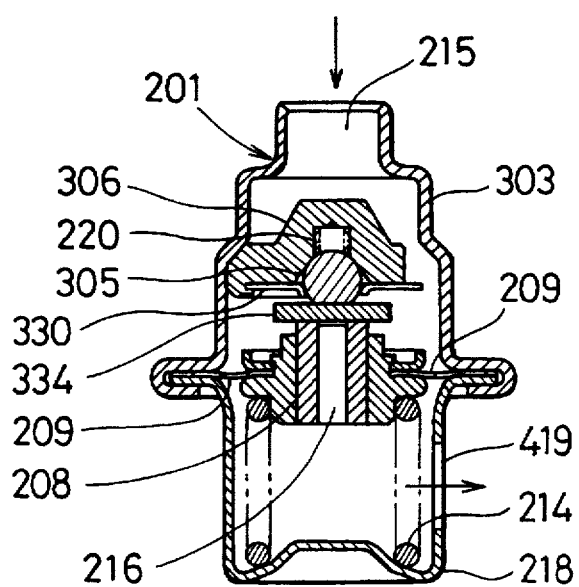
FIG. 9 is a cross-sectional view illustrating a pressure regulator according to a fifth embodiment of the present invention.

A fifth embodiment of the present invention is described with reference to FIG. 9.

In the fifth embodiment, an fuel outlet 419 of the pressure regulator 201 opens in the direction perpendicular to the axis of the valve aperture 216 of the movable valve member 208. Other portions are substantially the same as the embodiment shown in FIG. 3 and have the same reference numerals. That is, the fuel outlet 419 is not aligned with the axis of the valve aperture 216.

According to the fifth embodiment, the boiling-under-reduced-pressure takes place when the fuel flows from inlet-side of the movable valve member which is the high pressure side of the pressure regulator 201 to the outlet-side of the same which is the low pressure side. However, the noise caused by the boiling is interrupted by the housing 218 in the direction of the fuel flow and, therefore, reduced. In this embodiment, because the fuel in the pressure regulator is discharged from the fuel outlet 419 which opens perpendicular to the axis of the valve aperture 216, the flow speed of the fuel is reduced and the noise is reduced. The noise caused by the boiling-under-reduced-pressure is also suppressed in the direction of the fuel flow by the housing as a silencer.

(Sixth Embodiment)

sixth embodiment of the present invention is described with reference to FIGS. 10 and 11.

Figure 10:
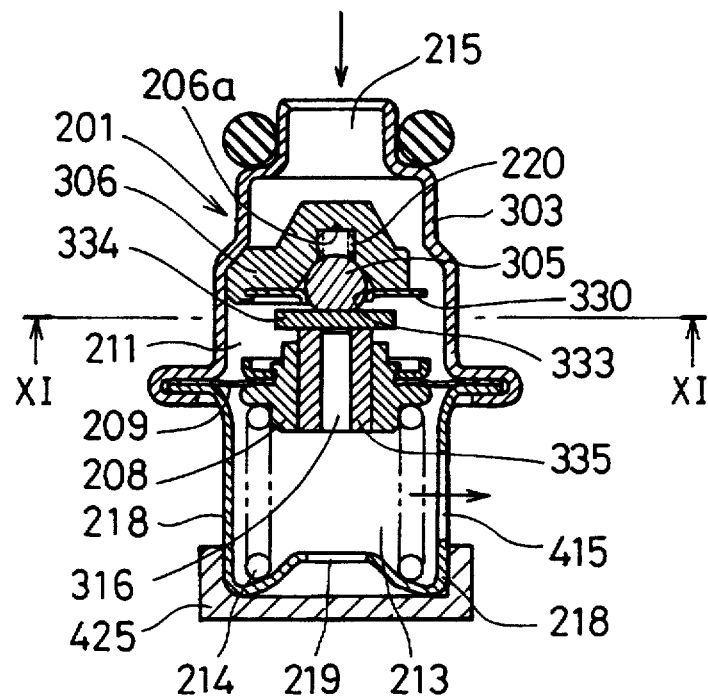
FIG. 10 is a cross-sectional view illustrating a pressure regulator according to a sixth embodiment of the present invention.
Figure 11:
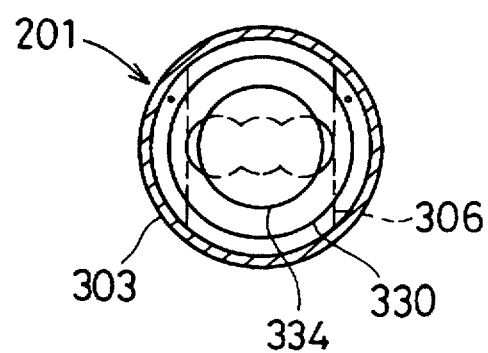
FIG. 11 is a cross-sectional view illustrating a portion cut along a line XI—XI in FIG. 10.

In the sixth embodiment shown in FIGS. 10 and 11, a cap 425 is press-fitted to the fuel outlet 219 of the pressure regulator 201. The cap 425 is made from a thick member of a highly rigid material, while the housing 218 is made from a thin plate. The fuel inlet 415 opens at a side of the housing in the radial direction as that of the fifth embodiment shown in FIG. 9.

In the sixth embodiment, the noise or the turbulence of the fuel flow is caused by the pressure drop when the fuel flows from the inlet-side of the valve aperture 316 through the diaphragm 209 to the outlet-side thereof. However, the noise is suppressed when the fuel is discharged from the fuel outlet 415 which opens in the direction perpendicular to the axis of the valve aperture 316. Because the cap 425 supports a portion of the housing 218 on the side of the fuel outlet 415, the vibration thereof can be effectively reduced, resulting in reducing the noise. That is, the cap 425 can be simply added if the noise reduction is needed.

(Seventh Embodiment)

A seventh embodiment of the present invention is described with reference to FIG. 12.

Figure 12:
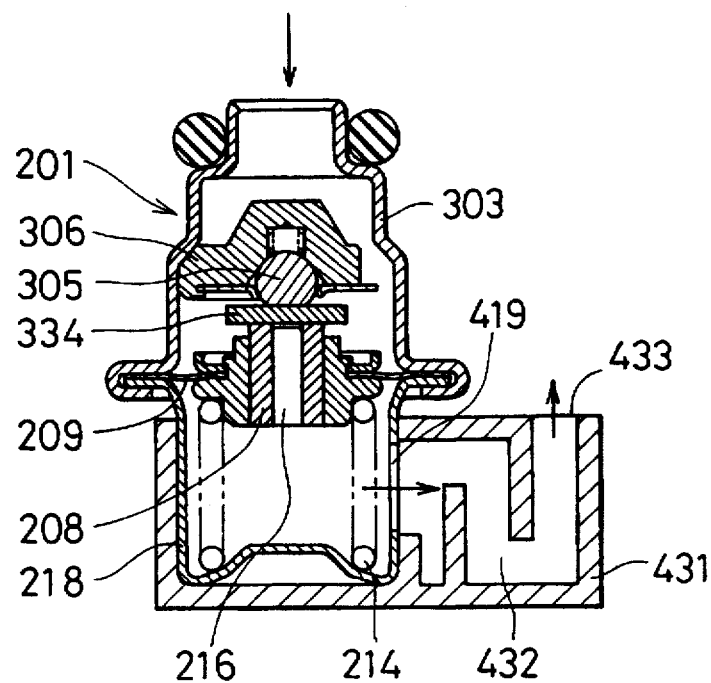
FIG. 12 is a cross-sectional view illustrating a pressure regulator according to a seventh embodiment of the present invention.

In the seventh embodiment shown in FIG. 12, a labyrinth member 431 is fixed to the inlet-side of the housing 218 of the pressure regulator 201. In the labyrinth 431, the fuel, which flows out of the fuel outlet 419, passes through a winding passage 432 before it is discharged from the pressure regulator 201. As a result, the noise suppressing effect is increased.

(Eighth Embodiment)

An eighth embodiment is described with reference to FIG. 13.

Figure 13:
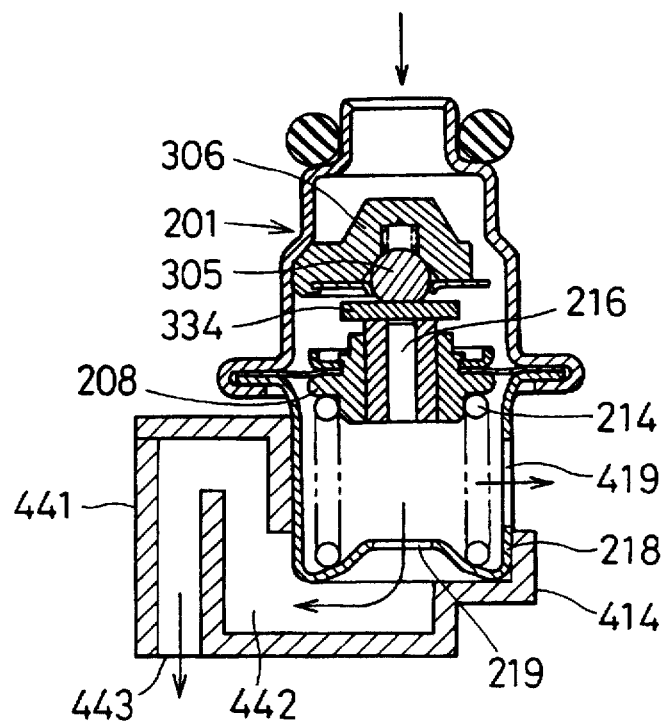
FIG. 13 is a cross-sectional view illustrating a pressure regulator according to an eighth embodiment of the present invention.

In the eighth embodiment shown in FIG. 13, a second labyrinth member 441 is fixed to the outlet-side of the pressure regulator 201 as in the ninth embodiment shown in FIG. 12.

The fuel outlet 219 of the housing 218 of the eighth embodiment is located at the same position as the third embodiment shown in FIG. 3. Therefore, substantially the same parts have the same reference number as the third embodiment.

In the eighth embodiment shown in FIG. 13, the fuel outlet 219 is disposed on the line in alignment with the axis of the valve aperture 216 passing through the diaphragm 209, and a winding passage 442 connects the fuel outlet 219 to a labyrinth outlet 443.

In this embodiment, the labyrinth member 441 reduces the flow speed of the fuel discharged from the fuel outlet of the pressure regulator 201, thereby reducing the turbulence of the fuel and the noise caused thereby.

(Overall Structure)

Figure 14:
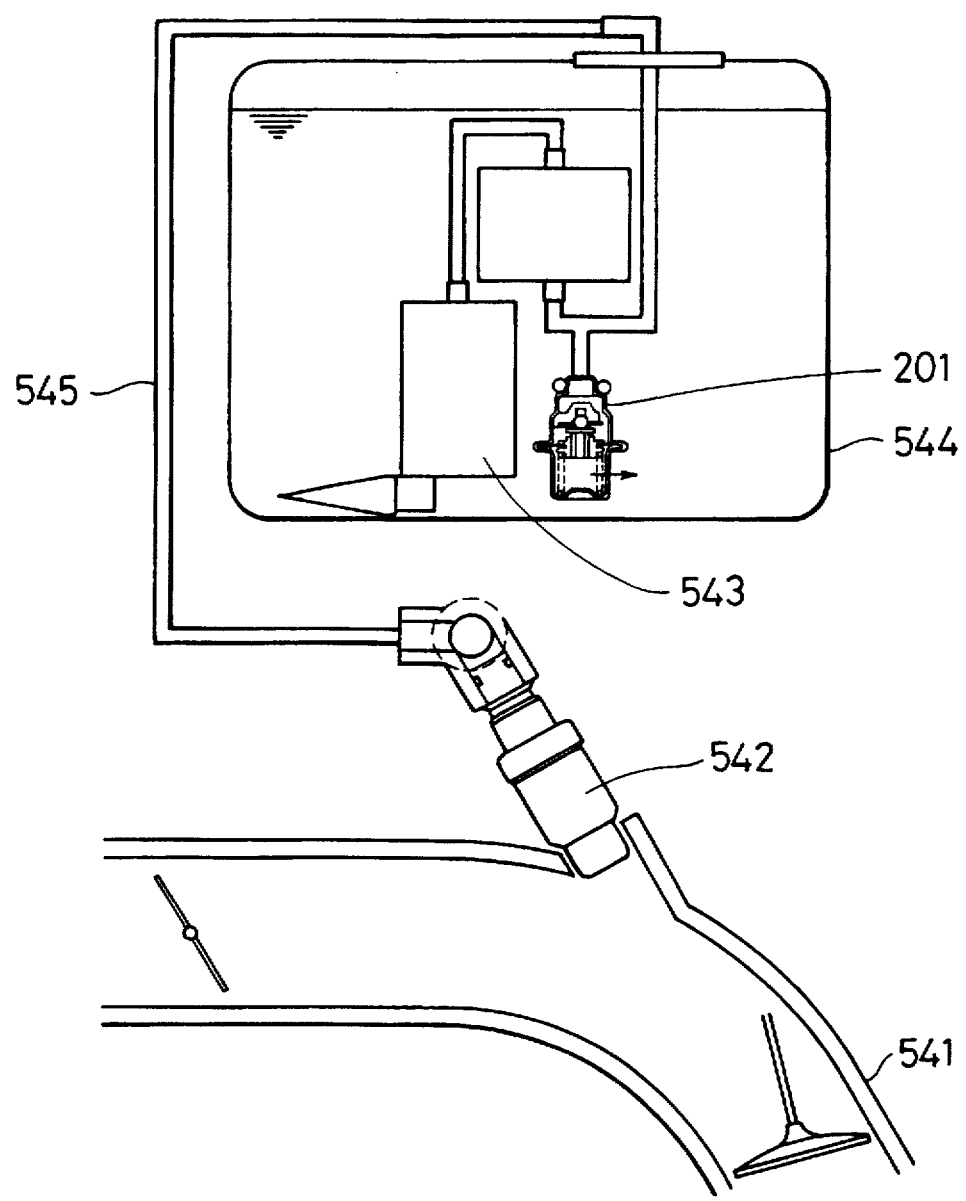
FIG. 14 is a schematic allover view illustrating a system including a fuel supply system according to the present invention.

An overall structure of a system including a fuel supply system according to the present invention is illustrated in FIG. 14.

FIG. 14 illustrates an in-tank type fuel supply system having a fuel pump 543 disposed in a fuel tank 544 for supplying fuel to a injector 542 installed in the air-intake-pipe 541 of an internal combustion engine. The pressure regulator 201 is submerged in the fuel in the fuel tank 544 to regulate the fuel supply pressure of the in-tank type fuel pump 543. The fuel regulated by the pressure regulator 201 is supplied to the injector 542 through a fuel supply pipe 545.

The fuel passage is formed on the convex portion and located between the convex portion and the housing. However, it can be formed in the housing as a through hole.

INDUSTRIAL APPLICABILITY

As described above, the pressure regulating valve according to the present invention is useful to a system for regulating fuel pressure of an engine fuel supply system and to a system installed in a fuel tank.

We claim:

1. A fuel supply system including a fuel pump disposed in a fuel tank for pumping fuel from the tank to a fuel injector, a fuel filter for removing foreign particles in said fuel before supplying said fuel to the injector, said fuel supply system including a fuel pressure regulating valve for regulating the fuel supplied to the injector, wherein said fuel filter is disposed, at least partially, around said fuel pump, and said fuel pressure regulating valve discharges fuel flowing in said fuel filter into said fuel tank and regulates a pressure of said fuel supplied to said injector, and said fuel pressure regulating valve further comprising:

a cylindrical case having a fuel inlet chamber having a fuel inlet open to the fuel pumped by the fuel pump, and a fuel outlet chamber open to a fuel outlet to said tank;

a diaphragm separating the fuel inlet chamber from the fuel outlet chamber, and the diaphragm having an outer periphery fixed to an inner periphery of said case;

a stationary valve fixed to said case between said fuel inlet and said diaphragm;

a movable valve member fixed to a central portion of said diaphragm and facing the stationary valve, said movable valve member having a valve aperture closed by said stationary valve when said movable valve member is seated on said stationary valve, and open when the movable valve member is unseated from the stationary valve; and a bias applied to said movable valve member to seat the valve aperture on the stationary valve;

wherein said stationary valve comprises a stationary valve member for closing said valve aperture on said movable valve member and a stationary valve guide for aligning said stationary valve member with said movable valve member;

said stationary valve guide having a generally thick disk structure with a central convex portion, ribs extending radially from the convex portion to an inner periphery of said case where outer surfaces of the ribs engage the inner periphery of the case, and concave grooves on the disk between the ribs and around the central convex portion of the disk, where the grooves in the disk face the inner periphery of the case to form fuel paths from said fuel inlet to said diaphragm.

2. A fuel system as in claim 1, wherein said pressure regulating valve is disposed at a side of the filter facing a bottom of the fuel tank.

3. A fuel system as in claim 1, wherein the fuel inlet and fuel outlet of said pressure regulating valve are disposed in a line parallel to an axis of the fuel pump.

4. A fuel system as in claim 1, wherein the pressure regulating valve is disposed in a semi-cylindrical cavity formed by an inner semi-circular side of the fuel filter.

5. A fuel system as in claim 1, wherein the pressure regulating valve is disposed below the fuel filter and adjacent the fuel pump.

6. A fuel system as in claim 1, wherein the fuel inlet and fuel outlet of said pressure regulating valve is disposed in a line perpendicular to an axis of the fuel pump.

7. A fuel supply system including a fuel pump disposed in a fuel tank for pumping fuel from the tank to a fuel injector, a fuel filter for removing foreign particles in said fuel before supplying said fuel to the injector, said fuel supply system including a fuel pressure regulating valve for regulating the fuel supplied to the injector, wherein said fuel filter is disposed, at least partially, around said fuel pump, and said fuel pressure regulating valve discharges fuel flowing in said fuel filter into said fuel tank and regulates a pressure of said fuel supplied to said injector, and said fuel pressure regulating valve further comprising:
a cylindrical case having a fuel inlet chamber having a fuel inlet open to the fuel pumped by the fuel pump, and a fuel outlet chamber open to a fuel outlet to said tank;
a diaphragm separating the fuel inlet chamber from the fuel outlet chamber, and the diaphragm having an outer periphery fixed to an inner periphery of said case;
a stationary valve fixed to said case between said fuel inlet and said diaphragm;
a movable valve member fixed to a central portion of said diaphragm and facing the stationary valve, said movable valve member having a valve aperture closed by said stationary valve when said movable valve member is seated on said stationary valve, and open when the movable value member is unseated from the stationary valve; and
a bias applied to said movable valve member to seat the valve aperture on the stationary valve;
wherein said stationary valve comprises a stationary valve member for closing said valve aperture on said movable valve member and a stationary valve guide for aligning said stationary valve member with said movable valve member;
said stationary valve guide having a generally thick disk structure with a central convex portion, ribs extending radially from the convex portion to an inner periphery of said case where outer surfaces of the ribs engage a shoulder on the inner periphery of the case, and concave grooves on the disk between the ribs and around the central convex portion of the disk, where the grooves in the disk face the inner periphery of the case to form fuel paths from said fuel inlet to said diaphragm.

* * * * *